Figure 1:
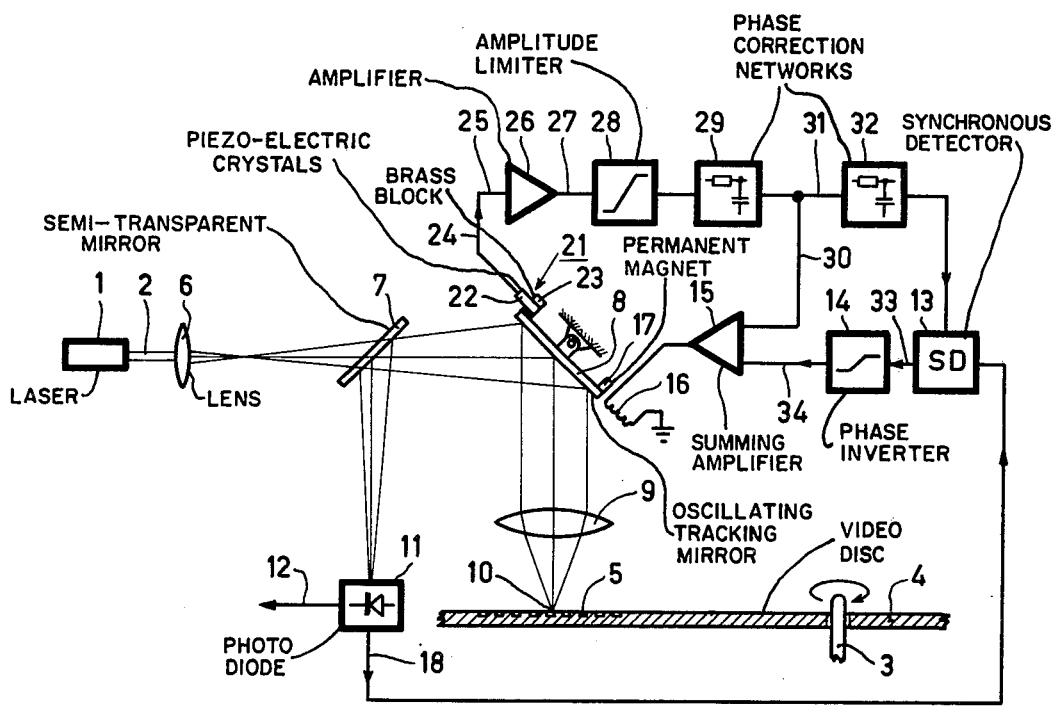

United States Patent
van Rosmalen

[11] 4,063,287
[45] Dec. 13, 1977

[54] TRACKING MIRROR DEVICE FOR A VIDEO DISC PLAYER

[75] Inventor: Gerard Eduard van Rosmalen, Eindhoven, Netherlands

[73] Assignee: U.S. Philips Corporation, New York, N.Y.

[21] Appl. No.: 660,498

[22] Filed: Feb. 23, 1976

[30] Foreign Application Priority Data

Oct. 15, 1975 Netherlands .................... 7512084

[51] Int. Cl.² .................. H04N 5/76; H04N 1/24
[52] U.S. Cl. ........................... 358/128; 350/7; 179/100.3 V; 250/202
[58] Field of Search .............. 350/7; 360/77; 179/100.3 V, 100.3 H; 250/202, 203, 570; 358/128; 346/109

[56] References Cited

U.S. PATENT DOCUMENTS

| | | | |
|---|---|---|---|
| 3,501,586 | 3/1970 | Russell | 179/100.3 V |
| 3,532,408 | 10/1970 | Dostal | 350/7 |
| 3,882,317 | 5/1975 | Camerik | 179/100.3 V |
| 3,946,166 | 3/1976 | Wossidlo | 179/100.3 V |

*Primary Examiner*—Bernard Konick
*Assistant Examiner*—Alan Faber

*Attorney, Agent, or Firm*—Frank R. Trifari; Simon L. Cohen

[57] ABSTRACT

A tracking mirror device, in particular for a video disc player, in which for following an information track on a video disc with a beam of radiation, use is made of a mirror which oscillates at a high frequency, which causes the beam of radiation, which serves for scanning the information track, to oscillate transversely to the information track at a high frequency and a small amplitude, while the filtered out high-frequency signal, as a function of its amplitude and its phase relationship with the high frequency voltage which is applied to the oscillating mirror, yields a control signal for following the information track. In accordance with the invention, use is made of an oscillating mirror which is driven electromagnetically and which is connected to oscillation compensation elements by means of springs which elements oscillate in phase opposition to the mirror. Thus, an oscillator mirror is obtained which can readily be excited to natural resonance and thus requires little power. On the mirror a piezo-electric miniature acceleration transducer can be mounted, which can provide a feedback signal so that the oscillating mirror can be included in a self-oscillating circuit.

10 Claims, 7 Drawing Figures

TRACKING MIRROR DEVICE FOR A VIDEO DISC PLAYER

The invention relates to a tracking mirror device destined for an apparatus for reading an information track on a record carrier with the aid of a read spot which is produced by a radiation beam. The beam is produced by a radiation source and reflected by a tracking mirror, for instance for a video disc player employing optical reading, which is provided with a tracking control circuit for keeping the read spot on the information track to be read by tilting the tracking mirror. The control circuit comprises a number of circuit elements, including: an oscillating mirror which oscillates at a high frequency with a drive means for causing the read spot to oscillate transversely to the information track at a high frequency and with small amplitude, a detection system for producing a detection signal depending on the coarse position of the read spot relative to the information track, an electronic control circuit for producing an electric control signal depending on the detection signal, as well as the said tracking mirror device, which includes an electro-dynamic drive means for causing the tracking mirror to be tilted depending on the control signal.

The article "Ein Bildplattensystem mit Laseraufzeichnung," Funkschau 1974, Heft 25, 3041–3044, describes a video disc player which is provided with such a tracking mirror device. With the aid of the tracking mirror device and a number of optical elements the beam of radiation is projected on the information track of a video disc. The radiation beam which is modulated by the information on the disc is subsequently read with the aid of a photodiode, i.e., the photodiode converts the modulation of the light intensity of the beam of radiation into a voltage modulation, which is applied to suitable electronic means for obtaining a suitable video and audio signal. The output signal of the photodiode is also used for the tracking control system, which serves to keep the read spot produced by the radiation beam constantly aimed at the information track. The oscillating mirror, which reflects the beam of radiation from the light source before it reaches the video disc, imparts small periodic deflections to the read spot in a direction transverse to the information track. These high frequency movements of the read spot result in high-frequency variations of low amplitude in the light intensity of the modulated radiation beam which is received by the photodiode. The amplitude of these high-frequency light variations, as well as the phase relationship thereof relative to the oscillating movements of the oscillating mirror, provide information about the degree and the direction of the deviation from the desired coarse position of the read spot. This information is obtained electronically by means of a so-called synchronous detection device, which produces a control signal which is fed to the tracking mirror for adjusting the tracking mirror so as to correct the coarse position of the read spot produced by the radiation beam relative to the information track.

In the known tracking mirror device the oscillating mirror is disposed on a piezo-ceramic resonator, which is energized by means of an oscillator with a preset frequency. The oscillator signal, which has a frequency of approximately 20 kHz, is also applied to the synchronous detection device, for detecting the phase relationship of the oscillator signal and the high-frequency signal obtained from the photodiode.

It is an object of the invention to provide a tracking mirror device of the type mentioned in the preamble which requires less power to drive the oscillating mirror at high frequency and with the required amplitude. The power required for this should not be too high, also in view of the dissipation problems associated with the small dimensions of the oscillating mirror. The invention provides a tracking mirror device in which the oscillating mirror can readily be driven with 30 kHz with the required amplitude using a low power only, and is characterized in that the tracking mirror devices comprises an electro-magnetic instead of a piezo-ceramic drive means for causing the oscillating mirror to oscillate with a high frequency, and that during operation the oscillating mirror is connected to one or more oscillation compensation elements, which oscillate in phase opposition relative to the oscillating mirror, by means of one or more springs.

In the tracking mirror device according to the invention use is made of mechanical resonant rise effects which occur between the oscillating mirror and the oscillation compensation elements which oscillate in phase opposition relative thereto. Thus, oscillations of comparatively high amplitude can be produced using low power only. For this, it is necessary that the oscillating mirror as well as the oscillation compensation elements can oscillate freely relative to each other. Attachment of the oscillating mirror and the oscillation compensation elements to a component which is rigidly connected to stationary parts of a video disc player, such as a piezo-ceramic resonator, is not possible with such a construction. It is therefore necessary to use two steps according to the invention in combination, i.e., the use of oscillation compensation elements in conjunction with an electro-magnetic and thus contactless this drive.

For obtaining the desired high frequency the following embodiment of the invention is of significance, which is characterized in that at least the base of the oscillating mirror, which is provided with the reflecting surface, as well as the springs and the oscillation compensation elements consist of the same material and together constitute an integral unit. If the oscillating mirror were constructed from several components, this would inevitably give rise to a point with a hardly controllable spring constant at the location of the fixation of the one component to the other, which spring constant would probably always be lower than the desired spring constant, and at which point moreover a certain degree of damping would be highly probable. It has been found that very favorable results can be obtained with an embodiment which is characterized in that the base of the oscillating mirror, the springs, and the compensation elements are constituted by portions of a single plate of quartz. In this embodiment effective use is made of the known property of quartz of having a very low internal mechanical damping.

Constructionally, the oscillating mirror may readily take the form of a next embodiment of the invention, which is characterized in that the oscillating mirror is pivotable so as to perform pivotal oscillations about an axis of oscillation, and that two oscillation compensation elements are provided at either side of the oscillating mirror, which are connected thereto by means of torsion springs whose torsion axis coincides with the said axis of oscillation. An alternative embodiment of the invention in which the oscillating mirror is also pivotable so as to perform pivotal oscillations, is characterized in that the oscillating mirror is connected to a single oscillation compensation element, namely by means of at least one flat spring whose bending axis extends parallel to the axis of oscillation of the oscillating mirror. Preferably, the electro-magnetic drive means for the oscillating mirror is provided, in a manner known per se, for example from Swiss patent specification CH-PS No. 354,117, with both permanent magnetic and, co-operating therewith, electromagnetic means, while in one embodiment the permanent magnetic means are connected to the oscillating mirror and/or the compensation elements and the electromagnetic means are arranged stationarily. When the oscillating mirror would be connected to electromagnetic means instead of permanent magnetic means, i.e., to a coil or to several coils, this would have the drawback that the coil terminations would exert an undesired damping effect on the oscillating mirror and, moreover, could give rise to undesired parasitic resonances.

Preferably, the springs are dimensioned so that the oscillating mirror has an oscillating frequency of approximately 30 kHz.

In practice, it will not be simple to manufacture the springs with which the oscillation compensation elements are connected to the oscillating mirror with such an accuracy that an accurately predetermined resonant frequency of the oscillating mirror is obtained. In view of this a following embodiment is of significance which is characterized in that an electrical acceleration transducer is disposed on the oscillating mirror or on the oscillation compensation element(s) and that this is electrically connected to the input of an electronic amplifier, whose output in its turn is connected to the electromagnetic means of the drive system of the oscillating mirror. In this respect the acceleration transducer may suitably comprise a piezo-electric crystal which is glued onto the oscillating mirror or onto an oscillation compensation element and to which an auxiliary mass is fixed, also by gluing. The electrical signals which are thus produced in the piezo-electric crystal are substantially proportional to the acceleration of the oscillating mirror.

Preferably a very suitable embodiment of the invention is used, which is characterized in that the tracking mirror and the oscillating mirror together consititute a combined oscillating tracking mirror. This oscillating tracking mirror thus performs both the pivoting movements of low frequency for following the information track and the pivoting movements of high frequency superimposed thereon for producing the detection signal. The high frequency voltage which is required for causing the oscillating tracking mirror to oscillate at high frequency may be applied to the same coils to which the control signal from the control circuit is applied. Because in this way both the oscillating mirror and the tracking mirror are combined with each other to a single combined oscillating tracking mirror, and the drive means for the tracking mirror and the oscillating mirror are combined to a single electro-magnetic drive means, a very compact unit is obtained which demands little space.

Figure 5:
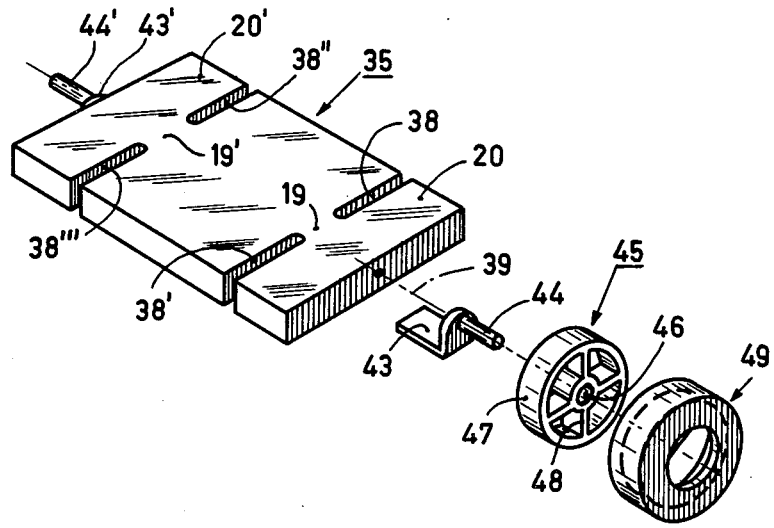
Figure 2:
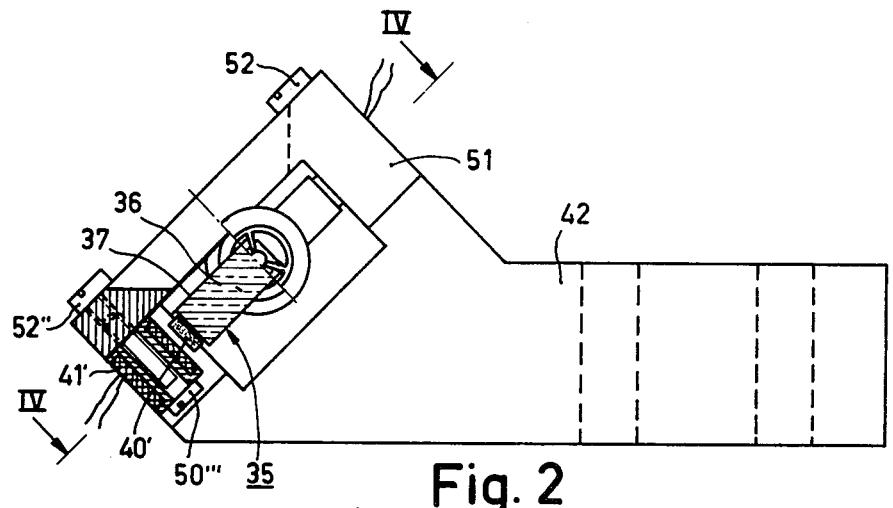
Figure 3:
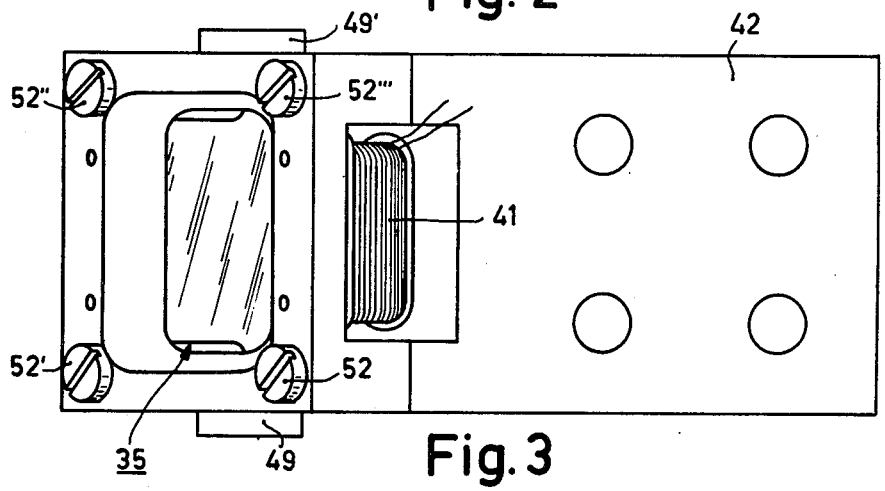
Figure 4:
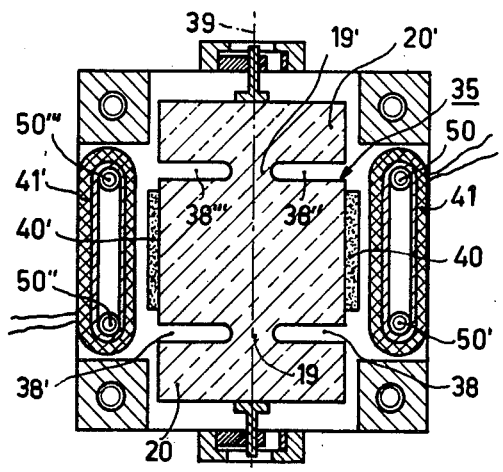
Figure 6:
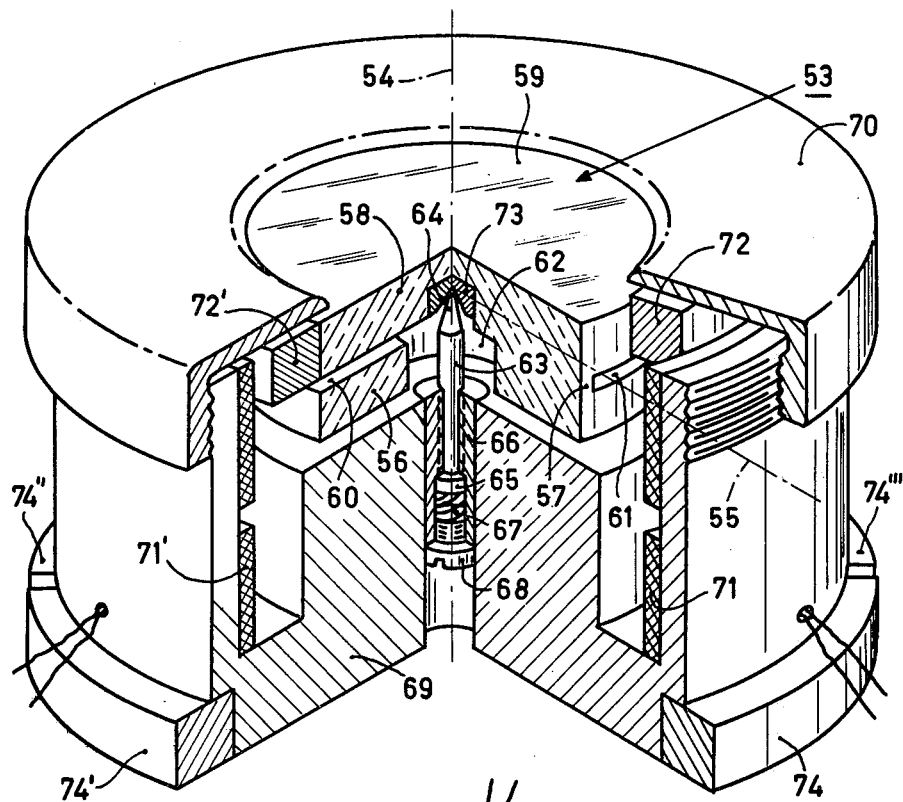
Figure 7:
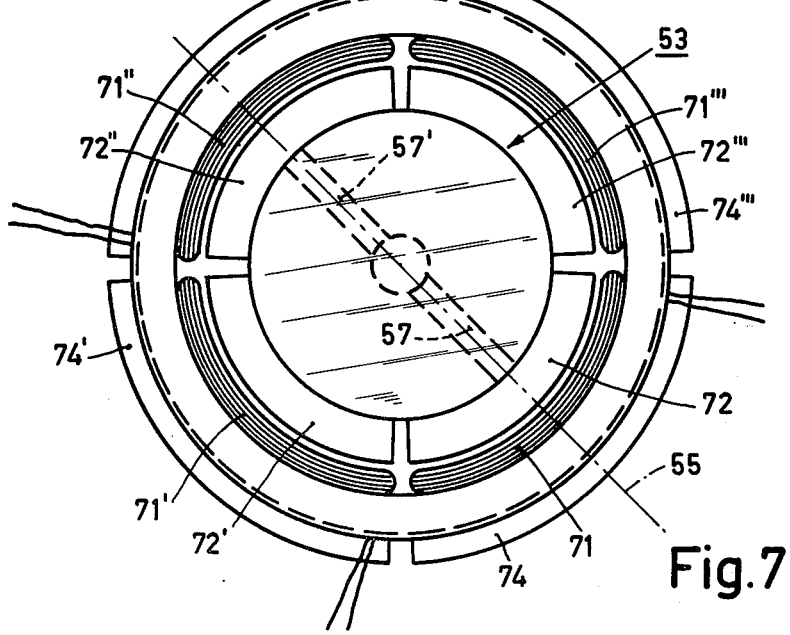

The invention will now be described in more detail with reference to the drawing, in which:

FIG. 1 schematically represents the tracking mirror device in accordance with the invention, FIG. 2 is a side view, partly in cross-section, of a mirror unit comprising a combined oscillating tracking mirror, its electrodynamic drive system, and a frame, FIG. 3 is a plan view of the mirror unit of FIG. 2, FIG. 4 is a cross-section of the mirror unit of FIG. 2 in accordance with the arrows III—III, FIG. 5 is an exploded view of some of the components of the mirror unit of FIGS. 2 through 4, FIG. 6 is a perspective view, partly in cross-section, of a mirror unit in accordance with a different embodiment, in which the oscillating tracking mirror can perform pivoting movements about every axis which passes through a specific pivoting point and parallel to the reflecting surface, and FIG. 7 is a plan view of the mirror unit of FIG. 6, where for the sake of clarity a cover at the top of the mirror unit has been omitted.

The diagram of FIG. 1 shows a radiation source 1, for example a laser. The laser produces a beam of radiation 2. A record carrier 4 in the form of a video disc is positioned on a rotating spindle 3. This video disc is rotated by the spindle 3, for example in the direction indicated by the arrow, and is provided with a spiral or semi-spiral information track 5 which is formed on the surface. This track consists of a series of pits or recesses in the surface of the video disc which are sequentially arranged in the direction of the track. The light beam 2 which emerges from the laser source is diverged to a more or less conical beam by a lens 6 and subsequently, after passing a semi-transparent mirror 7 and after being reflected by an oscillating track mirror 8, and passing a following lens 9, it is focussed to a read spot 10 on the surface of the video disc 4. The light beam which is reflected by the video disc 4 is converged by the lens 9 and subsequently concentrated onto a photodiode 11 via the oscillating tracking mirror 8 and the semi-transparent mirror 7. At 12 the output signal of the photodiode is applied to electronic means which process the video information and the audio information further in a suitable manner. However, the photodiode also forms part of a control circuit which in addition to the photodiode comprises a number of other circuit elements, namely: the high-frequency oscillating tracking mirror 8, an electronic control circuit 13 (to be referred to as synchronous detector hereinafter), a phase inverting network 14, a summing amplifier 15, as well as electromagnetic drive means for causing the oscillating tracking mirror to be tilted depending on the control signal supplied by the synchronous detector 13 and comprising a coil 16 and a permanent magnet 17 which is disposed on the mirror 8. The signal which is supplied by the photodiode 11 via the connection 18 constitutes the detection signal which is dependent on the position of the read spot 10 relative to the information track 5. The drive coil 16 in conjunction with permanent magnet 17 also forms an electrodynamic drive means for causing the oscillating tracking mirror 8 to oscillate with a high frequency, which mirror, see FIGS. 2 through 4, is connected to two oscillation compensation elements 20 and 20' by means of springs 19 and 19' which elements during operation oscillate in phase opposition relative to the oscillating tracking mirror. Hereinafter, identical elements will always be indicated by means of accents in the drawing, whereas for the sake of simplicity the accents will be omitted in the text when such elements are discussed in general.

On the oscillating tracking mirror 8 an electrical acceleration transducer 21 is disposed. This transducer comprises a piezo-electric crystal 22 which is glued onto the oscillating tracking mirror 8, but which might also be disposed on an oscillation compensation element, as well as an auxiliary mass in form of a block of brass 23 which is glued onto the crystal. The acceleration transducer 21 is connected to the input 25 of an amplifier 26 via the connection 24. The output 27 of this amplifier is in its turn connected to the drive coil 16 of the oscillating tracking mirror, namely via an amplitude limiting network 28, a phase correction network 29, and the amplifier 15. The oscillating tracking mirror 8 with its acceleration transducer 21, the amplifier 26, the networks 28 and 29, the amplifier 15, and the electromagnetic drive system consisting of a coil 16 and the permanent magnet 17, together with their mutual connections, constitute an oscillating loop. By means of feedback the high-frequency resonance oscillation of the oscillating tracking mirror 8 is sustained in this loop. When the video player is started the minimal oscillations of the oscillating tracking mirror 8, which are always present, ensure that it will oscillate at its resonant frequency.

The output signal of the phase-correction network 29 which is passed to the amplifier 15 via the connection 30 is also applied via a connection 31 to a subsequent phase correction network 32 and subsequently to the synchronous detector 30. The output signal of the synchronous detector which is available at 33 is dependent on the magnitude of the high frequency component of the signal supplied by the photodiode 11 in respect of its magnitude and on the phase relationship between the signals from the oscillator loop and the high frequency component of the signal from the photodiode 11 as regards its polarity, which may be positive or negative. After passing through the phase inverting network 14 the control signal is obtained in connection 34, which is amplified by the amplifier 15 and applied to the drive coil 16 for correcting the coarse position of the oscillating track mirror 8.

In FIGS. 2 through 4 the oscillating tracking mirror is designated by the reference numeral 35. This mirror comprises a base 36 on which a reflecting layer 37 is deposited. Said layer is so thin that it cannot be shown in cross-section in the figure. The base 36 together with the spring 19 and the oscillation compensation elements 20 forms an integral unit, so that they consist of the same material. As the oscillation compensation elements do not serve for reflecting a read beam, it is not necessary that the reflecting layer 37 also extends to the oscillation compensation elements 20. The base 36, the springs 19, and the oscillation compensation elements 20 are all formed by portions of a single plate of quartz. Local slots 38 are cut into this plate, so that the springs 19 are formed by the locally left quartz portion of the plate.

The oscillating tracking mirror 35 is pivotably journalled for performing pivotal oscillations about an axis of oscillation 39, see FIG. 4, which axis extends parallel to the reflecting surface 37. The torsion axis of the two springs 19 coincides with this axis of oscillation.

The electromagnetic drive means for the oscillating tracking mirror comprises two permanent magnets 40, which are connected to the mirror 35 by gluing, and two coils 41, which are disposed on the frame 42 of the mirror unit which is shown. This frame may be secured stationarily in a video disc player.

FIG. 5 clearly shows the manner in which the oscillating tracking mirror 35 is journalled. At both sides a bracket 43, on which a spindle 44 is located, is attached to the oscillating tracking mirror by gluing. This spindle is a tight fit in a bearing component 45 which is made of an elastic plastic. This component comprises a hub 46, a ring 47, as well as four spokes 48, which connect the hub to the ring. The spindle 44 tightly fits the hub 46 and the bearing component 45 is completely accommodated in a bush 49. This bush is suitably connected to the frame 42 of the mirror unit, for example again by gluing.

As can readily be seen in particular in FIGS. 2 and 3, the coils 41 are secured to a cap 51 with openings with the aid of a number of bolts 50, which cap in its turn is secured to the frame 42 with the aid of bolts 52.

The operation of the mirror unit of FIGS. 2 through 4 is as follows. By means of the coils 41 and the permanent magnets 40 whose direction of magnetization is not shown in the figures for the sake of simplicity, the oscillating tracking mirror 35 is brought into high frequency oscillation about the axis of oscillation 39. Via the two torsion springs 19 the oscillation compensation elements 20 are also caused to oscillate, but not in phase with the mirror 35 but in phase opposition thereto. The sprung-mass system consisting of the base of the oscillating tracking mirror 35, the mass of the two oscillation compensation elements 20, and the torsion springs 19 will begin the oscillate at its natural resonant frequency. The two coils 41 in conjunction with the permanent magnets 40 serve to cause the oscillating tracking mirror to perform pivoting movements of a substantially lower frequency about the axis 39 for following the information track of the video disc or, as the case may be, a different information carrier. Again an acceleration transducer, for example a piezo-electric acceleration transducer, may be arranged on the oscillating tracking mirror 35, or on one of the oscillation compensation elements 20. For the sake of clarity, this is not shown in FIGS. 2–5, but for this see FIG. 1.

In the mirror unit of FIGS. 6 and 7 the oscillating tracking mirror 53 is pivotable about every axis which is perpendicular to the axis 54 and which passes through the pivoting point of the pivot bearing arrangement to be described hereinafter. The axis 54 is the optical axis of the mirror unit, i.e., the normal through the center of the round oscillating tracking mirror 53 in the stationary, neutral position of the mirror. However, the oscillating tracking mirror 53 can only perform high-frequency oscillations about an axis of oscillation 55. For this see in particular FIG. 7. For this purpose, the oscillating tracking mirror 53 is connected to an oscillation compensation element 56 by means of two flat springs 57. The bending axis of these flat springs is parallel to the axis of oscillation 55. The oscillating tracking mirror 53, with the oscillation compensation element 56, and the flat springs 57 again forms an integral unit and is made of quartz. On the base 58 of the oscillating tracking mirror a reflecting layer 59 is deposited, while the combination of base 58, oscillation-compensation element 56 and flat springs 57 is constituted by a single block of quartz which is provided with serrations 60 and 61, while furthermore a bore 62 is formed for bearing purposes. This bearing arrangement is a pivot bearing which comprise a pivot pin 63 which is provided with a conical end 64, as well as a flange-shaped portion 65 at its other end, which pivot pin is mounted so as to be slightly depressable in the frame 69 of the mirror unit with the aid of a plastic bushing 66, a spring 67, and a screw 68. The frame is substantially cylindrical and comprises a screwed-on closing cap 70 at its top. At the inside of the cylindrical portion four substantially oval coils 61 are mounted by gluing. These coils co-operate with four permanent magnets 72, which are glued at the circumference of the oscillating tracking mirror 53. The two coils 71′ and 71′′′ are energized with the high-frequency oscillation voltage, in addition to the control voltages. In this mirror unit the oscillating tracking mirror is preferably also excited by an oscillation frequency which corresponds to its resonant frequency. For this purpose, an acceleration transducer may be mounted on the oscillating tracking mirror or on the oscillation compensation element 56, this is not shown in the drawing.

With the aid of the pivot pin 63, which cooperates with a bearing socket 73 which is disposed in the base 58 of the oscillating tracking mirror 53, the mirror is pivotable about every axis perpendicular to the optical axis 54 and passing through the end of the pivoting point 64. The coils 71 and 71′′ provide pivoting movements for the tangential tracking of the information track in a direction transverse to the axis of oscillation 55, while the coils 71′ and 71′′′ provide low-frequency pivoting of the mirror about the axis 55 for the radial tracking of the information track.

Around the frame 69 four positioning magnets 74 are glued. These co-operate with the permanent magnets 73 and serve both for returning the oscillating tracking mirror 53 to its neutral position in the absence of control voltages at the coils, and for constantly urging the mirror in the direction of the pivot pin 63 and thus holding the oscillating tracking mirror 53 against this pin. For further details with respect to the co-operation of the positioning magnets 74 with the magnets 72, as well as the overall construction of the mirror unit of FIGS. 6 and 7, reference is made to the applicant's previously filed U.S. patent application Ser. No. 638,510, filed Dec. 8, 1975.

What is claimed is:

1. A tracking mirror device for a track centering system of a video disc player, said centering system being of the type comprising deflection means including said mirror device for receiving a radiation beam and for reflecting it onto a radially selectable track of a rotating video disc in response to a deflection signal, and deflection signal generating means for sensing the position of the radiation beam with respect to said track and for providing said deflection means with a signal that periodically oscillates the radiation beam about a center position on the track; said tracking mirror device comprising a reflecting surface, electromagnetic drive means for positioning and oscillating the reflective surface at a high frequency in response to the deflection signal from the deflection signal generating means, at least one oscillation compensation element oscillating at the frequency of said mirror surface and in phase opposition therewith, and means for resiliently connecting the mirror surface to the oscillation compensation element.

2. A tracking mirror device as recited in claim 1, further comprising a base attached to the reflecting surface, wherein the base, the oscillation compensation means and the resilient connecting means consists of a single homogenous integral unit.

3. A tracking mirror device as recited in claim 2, wherein said integral unit comprises a plate of quartz having notches removed therefrom at portions separating the base from the compensation element.

4. A tracking mirror device as recited in claim 1, wherein the reflecting surface is pivotally supported for oscillations about an axis of oscillation, and wherein two oscillation compensation elements are provided on opposite sides of said reflecting surface, the resilient connecting means comprising torsion springs having a torsion axis that coincides with said axis of oscillation.

5. A tracking mirror device as recited in claim 1, wherein said reflecting surface is pivotal about a pivotal axis of oscillation, and wherein said resilient connecting means comprises a flat spring having a bending axis extending parallel to said axis of oscillation.

6. A tracking mirror device as recited in claim 1, wherein said electromagnetic drive means comprises a permanent magnet connected to the reflecting surface and a stationary electromagnetic coil magnetically coupled to the magnet.

7. A tracking mirror as recited in claim 6, further comprising an electrical acceleration transducer on one of said oscillating mirror or said oscillation compensation element and means connecting an output of said acceleration transducer to an input of said deflection signal generating means.

8. A tracking mirror device as recited in claim 7, wherein the acceleration transducer comprises a piezoelectric crystal and an auxiliary mass attached to the piezo-electric crystal.

9. A tracking mirror device as recited in claim 1, wherein said reflecting surface and the oscillation compensation element have a natural frequency of 30 kHz.

10. A tracking mirror device as recited in claim 1, wherein said reflecting surface, said oscillation compensating means and said deflection signal generator comprise an interconnected feedback path for generating a periodically oscillating portion of the deflection signal.

* * * * *